(No Model.)
H. TOWNSEND.
CATTLE CAR.
No. 254,246. Patented Feb. 28, 1882.
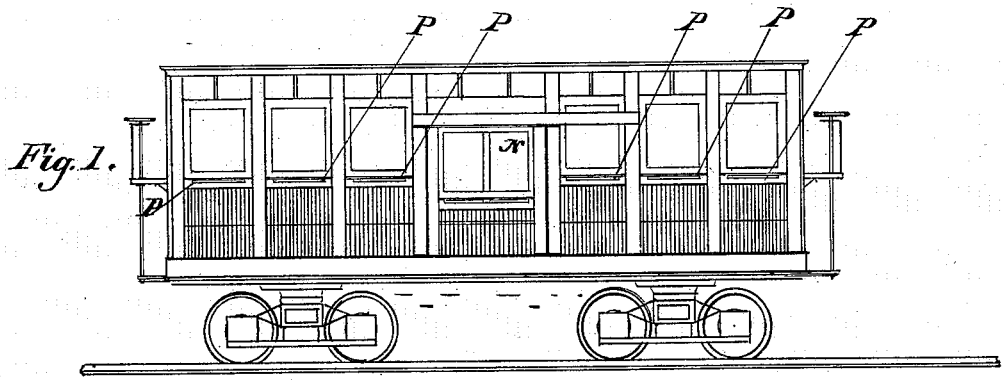
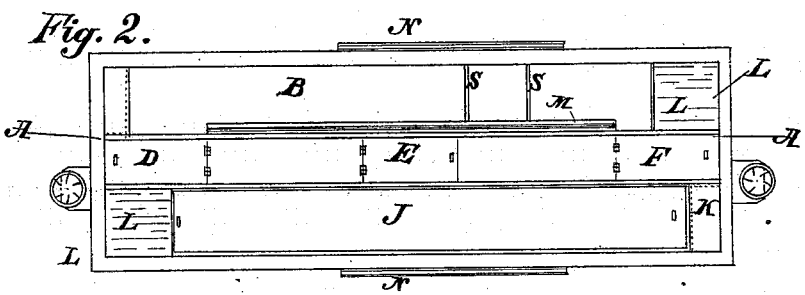
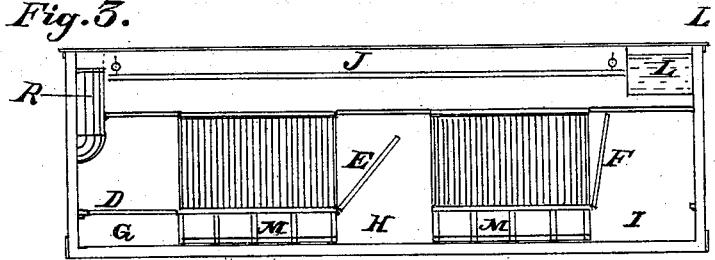
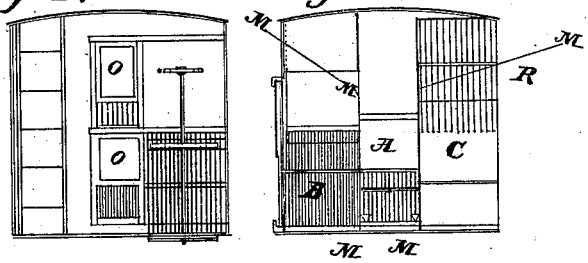
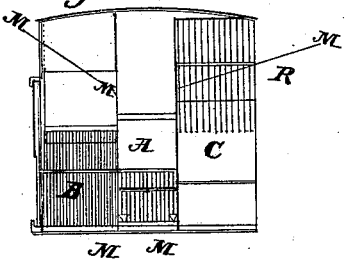
WITNESSES.
A. P. Wilson
S. G. Crawford
INVENTOR.
Harvey Townsend
By John H. Redstone
Attorney

UNITED STATES PATENT OFFICE.

HARVEY TOWNSEND, OF ALAMEDA, CALIFORNIA.

CATTLE-CAR.

SPECIFICATION forming part of Letters Patent No. 254,246, dated February 28, 1882.

Application filed July 23, 1880. (No model.)

*To all whom it may concern:*

Be it known that I, HARVEY TOWNSEND, of Alameda, in the county of Alameda and State of California, have invented certain new and useful Improvements in Railroad-Cars for Transporting Cattle and other Live Stock, of which the following is a specification, reference being had to the accompanying drawings and the letters marked thereon.

Figure 1 is a side elevation, Fig. 2 a sectional plan view, Fig. 3 a longitudinal sectional view, Fig. 4 an end elevation, and Fig. 5 a transverse section, of my improved car.

The object of my improvement is to provide a means of transporting cattle and other live stock in a comfortable manner, and to avoid all unnecessary suffering from want of rest and food, and to avoid the cruelty so commonly practiced in transferring cattle and other live stock by railroad. The following is the construction of the same.

The car is made of suitable width and height, and divided longitudinally by partitions, so as to form a narrow passage, A, through the center, and the spaces B and C as standing-room for the stock, as shown in the plan view, Fig. 2, and the transverse section, Fig. 5.

D, E, and F are doors, forming a continuation of the floor of the middle passage when the same are let down in the position shown in Fig. 2 and that of C in Fig. 3. The transverse passages forming the communication between the two sides B and C are closed, and the cattle in one side of the car are separated from those in the other.

At the forward end of each of the passages B and C are the feed-racks R, and besides these racks the cattle may be fed from the middle passage, A, and watered from the troughs M. The suspended floor J is designed to be used when sheep or small stock are carried, and to be drawn up out of the way when cattle are shipped. The car is designed to be made sufficiently high to allow a space for stowing hay.

The end doors, O, are designed to allow the attendants to pass from car to car through the whole train.

The following is the operation of the same: When the cattle are being loaded in the car, the door N or N, at the middle of the car, is opened, and the doors D and F are raised and the cattle are driven around, filling the whole of the passage to the dividing or partition bars S S, thus leaving the cattle all heading in one direction. By the use of these bars S S, which may be placed between the cattle at any point, any one of them may be separated from the rest and allowed sufficient space to lie down and rest; or they may all be driven forward, and when the one selected reaches the end space, G or I, or the middle space, H, the separating-bars S are placed to keep back the cattle and allow sufficient room for the cattle to lie down; or the cattle may at any time be moved forward to allow the ones most in need to feed at the rack R. By this arrangement the car may be fully loaded, their heads all toward the forward direction in the passages, and consequently not liable to get jammed or wedged in together.

The troughs M are replenished at any time from the tanks L.

Any one of the cattle may be taken out of the car at any time by simply moving the whole lot around until the required one is at one of the doors; then place in the separating bars S and allow the one to pass out at the door.

The doors and the different panels of the walls of the car are furnished with a suitable grating of bars and slides to cover the same when it is necessary to close up the car tightly, as shown by the slides P, thus regulating the ventilation and securing the proper protection against inclement weather.

Having thus described my invention, what I claim, and desire to secure by Letters Patent, is—

1. A stock-car divided by two longitudinal partitions into two side compartments, having between them a clear central passage extending throughout the length of the car, in combination with transverse passages and with swinging doors E, forming, when closed, a portion of the flooring of the central passage, the stock being carried in the side compartments only.

2. The combination and arrangement of the side divisions, B and C, with the transverse passages G H I, when operated in connection with the trap-doors D, E, and F and the cross-bars S, substantially as and for the purposes set forth.

HARVEY TOWNSEND.

Witnesses:
ORVILLE TOWNSEND,
THOS. G. LAMBERT.